United States Patent Office 3,528,534
Patented Sept. 15, 1970

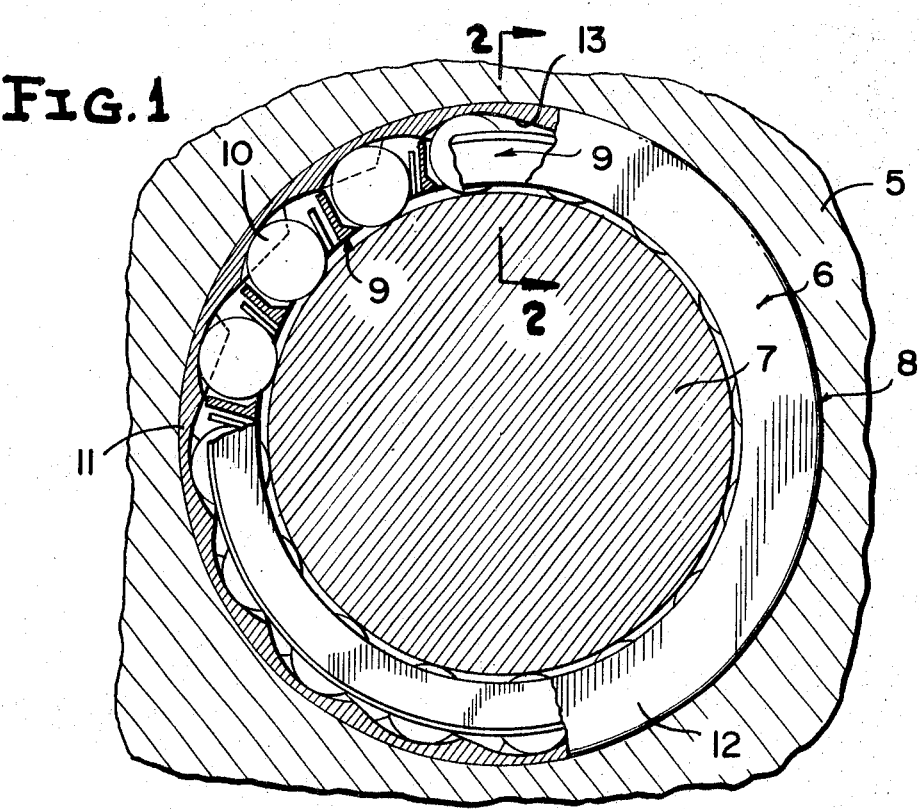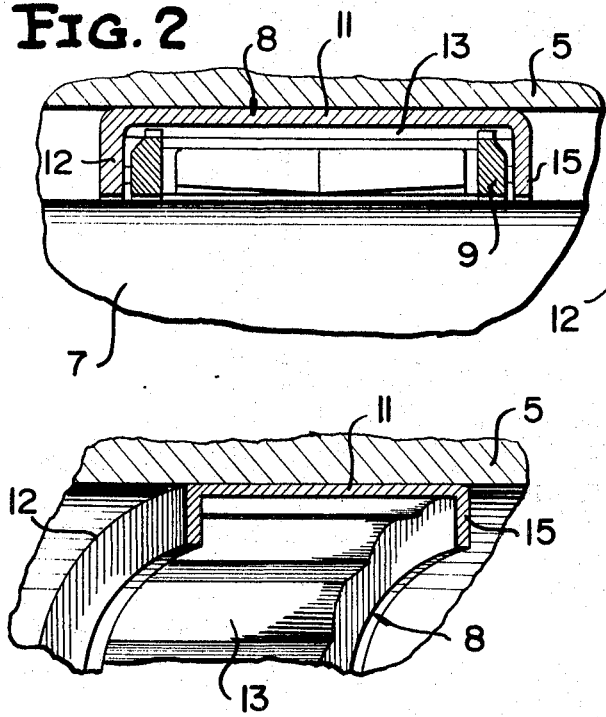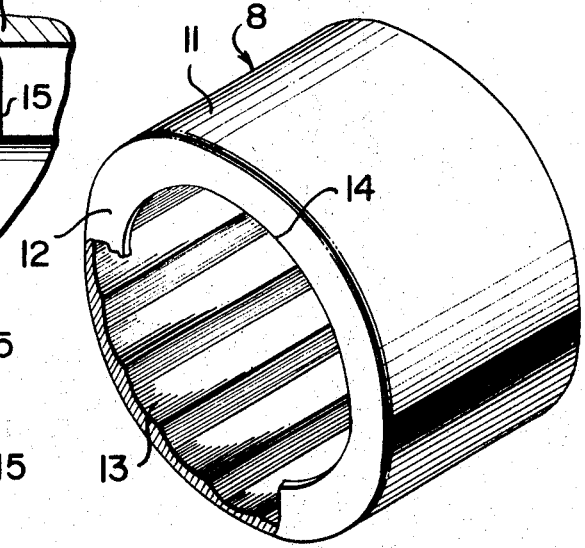

3,528,534
OVERRUNNING CLUTCH OUTER MEMBER
Carl F. Benson, Torrington, and John H. Cowles, Forestville, Conn., assignors to The Torrington Company, Torrington, Conn., a corporation of Delaware
Continuation-in-part of application Ser. No. 176,681, Mar. 1, 1962. This application Mar. 26, 1965, Ser. No. 442,970
Int. Cl. F16d 15/00
U.S. Cl. 192—45                 9 Claims

ABSTRACT OF THE DISCLOSURE

A one way roller clutch including an annular sleeve formed of thin sheet metal and having an outer cylindrical surface for frictional centering engagement within a machine element bore. The interior of the sleeve is formed with a plurality of circumferentially spaced and axially extending cam surfaces for engagement with clutch rollers.

---

This application is a continuation-in-part of our application Ser. No. 176,681, filed Mar. 1, 1962, now Pat. No. 3,184,020.

This invention in general relates to overrunning clutches and more particularly to the outer clutch member of an overrunning clutch. In overrunning clutches of the type to which this invention relates, there is normally provided an outer clutch member having a configurated internal surface defining a plurality of circumferentially spaced, axially extending cam surfaces which are engageable by rollers so as to provide a driving interlock between the outer clutch member and a shaft within the outer clutch member. Overrunning clutch of this type normally includes a cage for supporting the rollers into a wedging position between the shaft and the outer clutch member.

In the past, overrunning clutches of the type to which this invention relates have been relatively expensive and bulky. The outer member of necessity had to be thick and hardened to resist the high tensile stresses in the ring developed during the clutching action. Furthermore, because of the fact that the outer clutch member is heavy section, the attachment or connection of the outer clutch member is to a machine element usually by axial adjacent means rather than through the O.D. Therefore, axial as well as diametrical space is required for mounting the outer clutch member. In accordance with this invention, it is proposed to form the outer clutch member of sheet metal so as to be of a thin wall construction, thereby reducing the diameter of the outer member and allowing it to fit in the bore of a small gear, pulley or the like. In addition, it is proposed to simplify the formation of the cam surfaces on the interior of the clutch member by embossing the same. Accordingly, there has been provided an outer clutch member for overrunning clutches which is light in weight, which is formed in a manner which is much lower in cost than heretobefore possible and which is receivable in a smaller space in a machine element.

Another object of this invention is to provide an outer clutch member for a roller clutch which is initially tightly fitted within an associated machine element and thus derives its resistance to relative rotation between itself and the machine element, the clutch member being formed of resilient sheet metal and being temporarily expandable due to radially outwardly directed pressures exerted thereon by the wedging of rollers against cam surfaces thereof so as to increase the tightness of the fit between the outer clutch member and the associated machine element and thus increase the resistance to relative rotation between the clutch member and the machine element at the time when there is a tendency for relative rotation.

With the above and other objects in view that will hereinafter appear, the nature of the invention will be more clearly understood by reference to the following detailed description, the appended claims and the several views illustrated in the accompanying drawing:

In the drawing:

FIG. 1 is a transverse sectional view taken through two machine elements which are selectively coupleable together by means of an overrunning clutch embodying a clutch member formed in accordance with this invention.

FIG. 2 is a fragmentary view taken axially of the clutch along the line 2—2 of FIG. 1 and shows further the details of the clutch.

FIG. 3 is a perspective view of the outer clutch member with a portion of a retaining flange at one end thereof being broken away so as to clearly illustrate the details of the cam surfaces formed internally of the clutch member.

FIG. 4 is a fragmentary internal perspective with parts broken away and shows in section further the details of the outer clutch member.

Referring now to the drawings in detail, it will be seen that there is illustrated in FIG. 1 in particular a machine element 5 which has mounted therein a clutch assembly, generally referred to by the numeral 6, the clutch assembly 6 being of the overrunning type. A shaft 7 extends through the clutch assembly 6 and the clutch assembly 6 is utilized for the purpose of selectively coupling the shaft 7 and the machine element 5.

The clutch assembly 6 includes an outer clutch member, generally referred to by the numeral 8, which is the subject of this invention, and which will be described in more detail hereinafter. The clutch member 8 is carried by the machine element 5 and has retained therein a cage which is generally referred to by the numeral 9. The cage is restrained against axial movement out of the clutch member 8 and is mounted for limited relative circumferential movement. The cage 9, which is more fully described in our Pat. No. 3,184,020, supports a plurality of circumferentially spaced rollers 10. The rollers 10 normally ride on the shaft 7 and are selectively wedgeable with cam surfaces formed on the interior of the clutch member 8. The rollers 10 are engaged with the clutch member 8 by the action of the cage 9 with respect to the clutch member 8.

The clutch member 8 is advantageously formed from sheet metal and has a thin wall. In the initial form thereof, the clutch member 8 is in the form of a drawn cup. The clutch member 8 is formed from a sheet of metal which is deep drawn into a suitable die so as to have a shell-like body 11 and an integral end panel 12 at one end thereof. The die (not shown) includes an external die and an internal die, the internal die being generally in the form of a punch. The external die is configurated so as to shape the sheel-like body 11 to have a cylindrical exterior. The internal die or punch is shaped so as to selectively thin the wall to effect a flow of the metal during the drawing thereof so as to provide the shell-like body with an embossed or configurated internal surface. This internal surface is in the form of a plurality of circumferentially spaced, axially extending cam or wedge surfaces 13.

It will be readily apparent that inasmuch as the clutch member 8 is internally embossed or configurated during the drawing thereof from a sheet of metal, the forming operation may be carried out at a minimum cost.

After the cup shape of the outer clutch member 8 has been formed, a suitable cutter (not shown) engages the end panel 12 so as to form a centered shaft receiving opening 14 therein. As a result, the final configuration of the end panel 12 is in the form of a radially inwardly extending retaining flange.

It is to be noted from FIGS. 2 and 4 that the outer clutch member 8 includes a second radially inwardly directed retaining flange 15. The flange 15 is inwardly turned after the cage 9 has been assembled within the outer clutch member 8.

It is preferred that the outer clutch member 8 have at least the internal surface thereof hardened. The hardening of the outer clutch member 8 is economically accomplished by means of a heat treating process and is normally accomplished prior to the positioning of the cage 9 therein and the turning of the flange 15 although it is feasible to heat treat both the outer clutch member 8 and the cage 9 simultaneously.

Clutch members formed in accordance with this invention are not restricted as to the specific configuration of the cam surfaces thereof nor for use in conjunction with the specific cage 9. For this reason, the configuration of the cam surface 13 and the structural details of the cage 9 are not described further herein.

It will be understood that when the outer clutch member 8 is firmly pressed into the machine element, the coaction between the clutch member 8 and the machine element 5 will assure the proper roundness and trueness of the clutch member 8 despite the fact that it has been heat treated. It will also be apparent that the machine element 5 will provide adequate support for the outer clutch member 8 despite the thinness of the walls thereof.

It is to be understood that the clutch member 8, being formed of sheet metal, has less resistance to tensile stresses as compared to clutch members machined from relatively thick stock. As a result, during the operation of the clutch 6, when the rollers 10 are wedged between the shaft 7 and the cam surfaces 13, a radially outwardly directed pressure will be exerted on the clutch member 8 by each of the rollers resulting in a minute outward expansion of the clutch member 8 with the resultant increase in the pressure of the fit between the clutch member 8 and the associated machine element 5. This increase in the pressure of the fit between the clutch member 8 and the machine element 5 will automatically result in an increase in the resistance to relative rotation between the clutch member and the machine element. It thus will be apparent that when the forces attempting to effect the relative rotation of the cluch member 8 and the element 5 are a maximum, the resistance is also at a maximum. Accordingly, not only is it advantageous to form the clutch member 8 from sheet metal from a standpoint of cost of producing the clutch member and the reduction of the space required to receive the clutch member, but also the resiliency of the thin sheet metal from which the clutch member is formed provides for a definite advantage not heretobefore available with clutch members which are machined from relatively rigid components.

Although only a preferred embodiment of the invention has been specifically illustrated and described herein, it is to be understood that minor variations may be made in the clutch member within the spirit and scope of the invention, as defined in the appended claims.

We claim:

1. An outer clutch member for an overrunning clutch comprising a thin sheet metal shell having a cylindrical external surface of circular configuration for frictional centering engagement within a machine element bore and an embossed internal surface defining a plurality of circumferentially spaced axially extending cam surfaces, said shell varying in thickness circumferentially.

2. A thin wall outer clutch member for an overrunning clutch comprising a cup including a body and an end panel having a central shaft receiving opening, said body being formed of sheet metal drawn to define a cylindrical external surface for frictional centering engagement within a machine element bore and an embossed internal surface defining a plurality of circumferentially spaced axially extending cam surfaces, said body varying in thickness circumferentially.

3. A thin wall outer clutch member for an overrunning clutch comprising a drawn sheet metal cup including a body and an end panel, said end panel having a central shaft receiving opening, said body having a cylindrical external surface and an embossed internal surface defining a plurality of circumferentially spaced axially extending cam surfaces of uniformly changing radial dimension the end of said body remote from said end panel having an inturned radial retaining flange.

4. In an overrunning clutch, a one-piece outer clutch member particularly adapted to be tightly received in a machine element and supported thereby, said clutch member being a drawn construction and formed from sheet metal to have a thin wall, said clutch member being in the form of a shell having a generally cylindrical external surface and an embossed internal surface defining a plurality of circumferentially spaced axially extending cam surfaces, and a radially inwardly directed retaining flange at each end of said shell.

5. The clutch member of claim 4 wherein said shell varies in thickness circumferentially.

6. An outer clutch member for an overrunning clutch, said outer clutch member being particularly adapted to have a firm press fit within a rigid machine element and comprising a thin wall shell having a cylindrical external surface defining a cylinder for tight friction center engagement within a machine element bore and a configurated internal surface defining a plurality of circumferentially spaced axially extending cam surfaces, said shell varying in thickness circumferentially and being formed of resilient sheet metal for readily transmitting radially outwardly directed forces to an associated machine element under operating conditions in response to the application of radially outwardly directed forces on said cam surfaces whereby the tightness of the fit between said clutch member and an associated machine element will be increased at the time of maximum stress.

7. In an overrunning clutch, the combination of a rigid machine element having a cylindrical bore and an outer clutch member tightly frictionally retained within said machine element bore, said outer clutch member comprising a thin wall shell having a cylindrical external surface conforming to said bore and a configurated internal surface defining a plurality of circumferentially spaced axially extending cam surfaces, and said outer clutch member being formed of resilient sheet metal capable of readily transferring to said machine element radially outwardly directed pressures exerted on said cam surfaces in the operation of the clutch so as to increase the pressure of the fit between said clutch member and said machine element and thereby increase the resistance to relative rotation between said clutch member and said machine element.

8. The combination of an overrunning clutch assembly with a machine element and a shaft, said overrunning clutch assembly comprising an outer clutch member including a thin wall shell having a generally cylindrical external surface and a configurated internal surface defining a plurality of circumferentially spaced axially extending cam surfaces, said machine element having a bore tightly receiving said clutch member with the resistance to relative rotation between said clutch member and said machine element being due to the frictional fit between said clutch member and said machine element, a plurality of rollers disposed between said shaft and said outer clutch member with one roller for each of said cam surfaces and a cage positioned between said shell and said shaft for maintaining said rollers in circumferentially spaced relation with said outer clutch member to effect the engagement and disengagement of said rollers with said cam surfaces, said shell being formed of a resilient sheet metal whereby when said rollers are wedged between said shaft and said cam surfaces, said shell is outwardly expanded and the pressure of the fit between said outer clutch member and said machine element is increased thereby increasing the resistance to relative rotation between said clutch member and said machine element at the time when the forces urging relative rotation between said clutch member and said machine element are at a maximum.

9. An outer clutch member for an overrunning clutch comprising a thin wall metal shell formed of sheet metal drawn to have an outer surface in the shape of a cylinder for frictional centering engagement within a cylindrical machine element bore and an embossed internal surface defining a plurality of circumferentially spaced axially extending cam surfaces of uniformly changing radial dimension, said shell wall varying in thickness circumferentially.

References Cited
UNITED STATES PATENTS

| | | | |
|---|---|---|---|
| 348,961 | 9/1896 | Rice | 192—44 |
| 1,142,574 | 6/1915 | Huck | 192—45 |
| 1,724,983 | 8/1929 | Weiss | 192—45 |
| 2,691,896 | 10/1954 | Stageberg | 192—45 |
| 3,011,606 | 12/1961 | Ferris et al. | 192—45 |
| 3,014,567 | 12/1961 | Stockton | 192—45 |
| 1,716,750 | 6/1929 | Anderson | 192—45 |
| 2,864,629 | 12/1958 | Hall | 285—390 |
| 3,174,598 | 3/1965 | Mattson | 192—45 |

BENJAMIN W. WYCHE III, Primary Examiner

U.S. Cl. X.R.

188—82.84